US012574674B2

(12) United States Patent
Zhao et al.

(10) Patent No.: US 12,574,674 B2
(45) Date of Patent: Mar. 10, 2026

(54) EARPHONE

(71) Applicant: GOERTEK TECHNOLOGY CO., LTD., Qingdao (CN)

(72) Inventors: Changhong Zhao, Qingdao (CN); Zhiwei Hu, Qingdao (CN); Liang Zhang, Qingdao (CN); Shizhan Sun, Qingdao (CN); Xin Dong, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 130 days.

(21) Appl. No.: 18/587,294

(22) Filed: Feb. 26, 2024

(65) Prior Publication Data

US 2024/0196128 A1 Jun. 13, 2024

Related U.S. Application Data

(63) Continuation of application No. PCT/CN2021/140655, filed on Dec. 23, 2021.

(30) Foreign Application Priority Data

Sep. 27, 2021 (CN) .......................... 202111137390.3

(51) Int. Cl.
*H04R 1/10* (2006.01)

(52) U.S. Cl.
CPC ......... *H04R 1/1066* (2013.01); *H04R 1/1016* (2013.01); *H04R 2420/07* (2013.01)

(58) Field of Classification Search
CPC ........................... H04R 1/1066; H04R 1/1016; H04R 2420/07; H04R 1/105; H04R 1/10; H04M 1/05
See application file for complete search history.

(56) References Cited

U.S. PATENT DOCUMENTS

| | | | | |
|---|---|---|---|---|
| 6,256,386 B1 * | 7/2001 | Phillips | ................ H04R 1/1066 379/433.02 | |
| 2005/0208980 A1 * | 9/2005 | Tsai | ........................ H04M 1/05 455/569.1 | |

FOREIGN PATENT DOCUMENTS

| | | | | | |
|---|---|---|---|---|---|
| CN | 1976542 | A | * 6/2007 | ............... H04R 1/10 |
| CN | 206851001 | U | 1/2018 | |
| CN | 212163675 | U | 12/2020 | |
| CN | 212183727 | U | 12/2020 | |
| CN | 212677353 | U | 3/2021 | |
| CN | 113660576 | A | * 11/2021 | ............... H04R 1/10 |
| CN | 113747302 | A | 12/2021 | |
| WO | 2017152388 | A1 | 9/2017 | |

OTHER PUBLICATIONS

First Office Action in Corresponding Chinese Application No. 202111137390.3, dated Aug. 2, 2022; 11 pgs.

(Continued)

*Primary Examiner* — Angelica M McKinney

(74) *Attorney, Agent, or Firm* — HAUPTMAN HAM, LLP

(57) ABSTRACT

Disclosed is an earphone, including an earbud structure and an earphone handle; the earphone handle is rotatably connected to the earbud structure to adjust a wearing posture of the earphone handle. The main objective of the present application is to provide an earphone that can adjust the wearing posture of the earphone handle, thereby improving the user's wearing comfort.

13 Claims, 16 Drawing Sheets

(56) References Cited

OTHER PUBLICATIONS

Grant Notification in Corresponding Chinese Application No. 202111137390.3, dated Sep. 5, 2022; 5 pgs.
International Search Report and Written Opinion in Corresponding International Application No. PCT/CN2021/140655, mailed Jun. 8, 2022; 13 pgs.

* cited by examiner

EARPHONE

CROSS-REFERENCE TO RELATED APPLICATIONS

The present application is a continuation application of International Application No. PCT/CN2021/140655, filed on Dec. 23, 2021, which claims priority to Chinese Patent Application No. 202111137390.3, filed on Sep. 27, 2021. The disclosures of the above-mentioned applications are incorporated herein by reference in their entireties.

TECHNICAL FIELD

The present application relates to the technical field of earphone structures, and in particular to an earphone.

BACKGROUND

Currently, the sizes and shapes of earphones in the market are all fixed (except for the earbud caps), so different people have different wearing postures and comfort levels when wearing the same earphone. In the related art, the size and the shape structure of the earphones are fixed and cannot be adjusted. When different users wear the earphones, the wearing comfort and usability of the earphones is poor.

SUMMARY

The main objective of the present application is to provide an earphone that can adjust the wearing posture of the earphone handle, thereby improving the user's wearing comfort.

In order to achieve the above objective, the present application provides an earphone, including: an earbud structure; and an earphone handle;

the earphone handle is rotatably connected to the earbud structure to adjust a wearing posture of the earphone handle.

In an embodiment, one of the earphone handle and the earbud structure is provided with a rotating portion, and the other of the earphone handle and the earbud structure is provided with a rotating groove, and the rotating portion is rotatably provided in the rotating groove, so that the earphone handle is rotatably connected to the earbud structure.

In an embodiment, one end of the earphone handle is provided with the rotating portion, and the earbud structure is provided with the rotating groove;

a plane where a notch of the rotating groove is located is defined as a reference plane, and an axis of the earphone handle is configured to extend along an extension direction of the earphone handle; and in response to that the earphone handle rotates relative to the earbud structure, an angle between the axis of the earphone handle and the reference plane is $\theta 1$, and $0 \leq \theta 1 \leq 45°$.

In an embodiment, the rotating portion is provided with a shaft hole, the earbud structure is provided with an abutting shaft at least partially in the rotating groove, and the abutting shaft is rotatably provided in the shaft hole.

In an embodiment, the earbud structure is further provided with a fixed chamber and a sliding port, and the fixed chamber is communicated with the rotating groove through the sliding port; and the abutting shaft includes an elastic member and a connector, one end of the elastic member is connected to a wall of the fixed chamber, the other end of the elastic member is connected to one end of the connector, and the other end of the connector is configured to extend into the rotating groove through the sliding port and is rotatably provided in the shaft hole.

In an embodiment, the rotating portion is further provided with a first convex arc surface, and a wall of the rotating groove is formed with a first concave arc surface matched with the first convex arc surface; and/or the earphone handle is provided with a battery, the rotating portion is provided with a conductive column electrically connected to the battery, and the conductive column is provided with a contacting piece corresponding to the shaft hole; the earbud structure is provided with a circuit board, the abutting shaft is electrically connected to the circuit board, and the abutting shaft is rotatably provided in the shaft hole and is abutted against the contacting piece.

In an embodiment, the rotating portion is a spherical convex portion, and the rotating groove is a spherical concave groove matched with the spherical convex portion.

In an embodiment, the rotating portion is provided with a clamping groove, the earbud structure is further provided with a connecting member at least partially in the rotating groove, and the connecting member is movably clamped in the clamping groove.

In an embodiment, two connecting members are provided, the two connecting members are symmetrical and along the extension direction of the earphone handle, and the rotating portion is provided with the clamping groove corresponding to the connecting member.

In an embodiment, the earbud structure is also provided with a cavity and a circuit board located in the cavity, the wall of the rotating groove is provided with a via hole communicated with the cavity, and one end of the connecting member is configured to extend into the cavity through the via hole and is electrically connected to the circuit board;

the earphone handle is provided with the battery, the rotating portion is provided with a conductive column electrically connected to the battery, and the conductive column is provided with the contacting piece corresponding to the clamping groove; and the connecting member is movably clamped in the clamping groove and is abutted against the contacting piece.

In an embodiment, one end of the connecting member located in the rotating groove is provided with a second convex arc surface, and the contacting piece is provided with a second concave arc surface matched with the second convex arc surface.

In an embodiment, the earbud structure includes: an earbud shell and a rotating shell;

the earbud shell is provided with the cavity and an opening communicated with the cavity; and the rotating shell is provided with the rotating groove, the rotating shell is movably provided in the cavity, the notch of the rotating groove is directly communicated with the opening, and the connecting member is connected to the rotating shell.

In an embodiment, the earbud shell is provided with a sliding groove adjacent to the opening, the rotating shell is provided with a slider adjacent to the notch of the rotating groove, and the slider is slidably provided in the sliding groove, so that the rotating shell is rotatably connected to the earbud shell.

In an embodiment, the earbud shell is provided with two sliding grooves, the two sliding grooves are symmetrical, the rotating shell is provided with two sliders, and the sliders are slidably provided in the sliding groove;

a connection line between the two sliders and a connection line between the two connecting members are at an angle, and the connection line of the two connecting members is defined as a reference line; and in response to that the rotating shell rotates relative to the earbud shell, an angle between the axis of the earphone handle and the reference line is θ2, and 0≤θ2≤45°.

In an embodiment, the earbud structure is provided with a first magnetic member, and the earphone handle is provided with a second magnetic member magnetically connected to the first magnetic member.

The earphone provided by the present application is a two-part structure, including the earbud structure and the earphone handle, so that the earphone handle is rotatably connected to the earbud structure. Therefore, when the user wears the earphone, after the earbud structure of the earphone is inserted into the user's ear, the angle between the earphone handle and the earbud structure can be adjusted to adjust the wearing posture of the earphone handle, thereby improving the user's wearing comfort and solving the problem of wearing discomfort of different users caused by differences in ear size and shape.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

Figure 1:
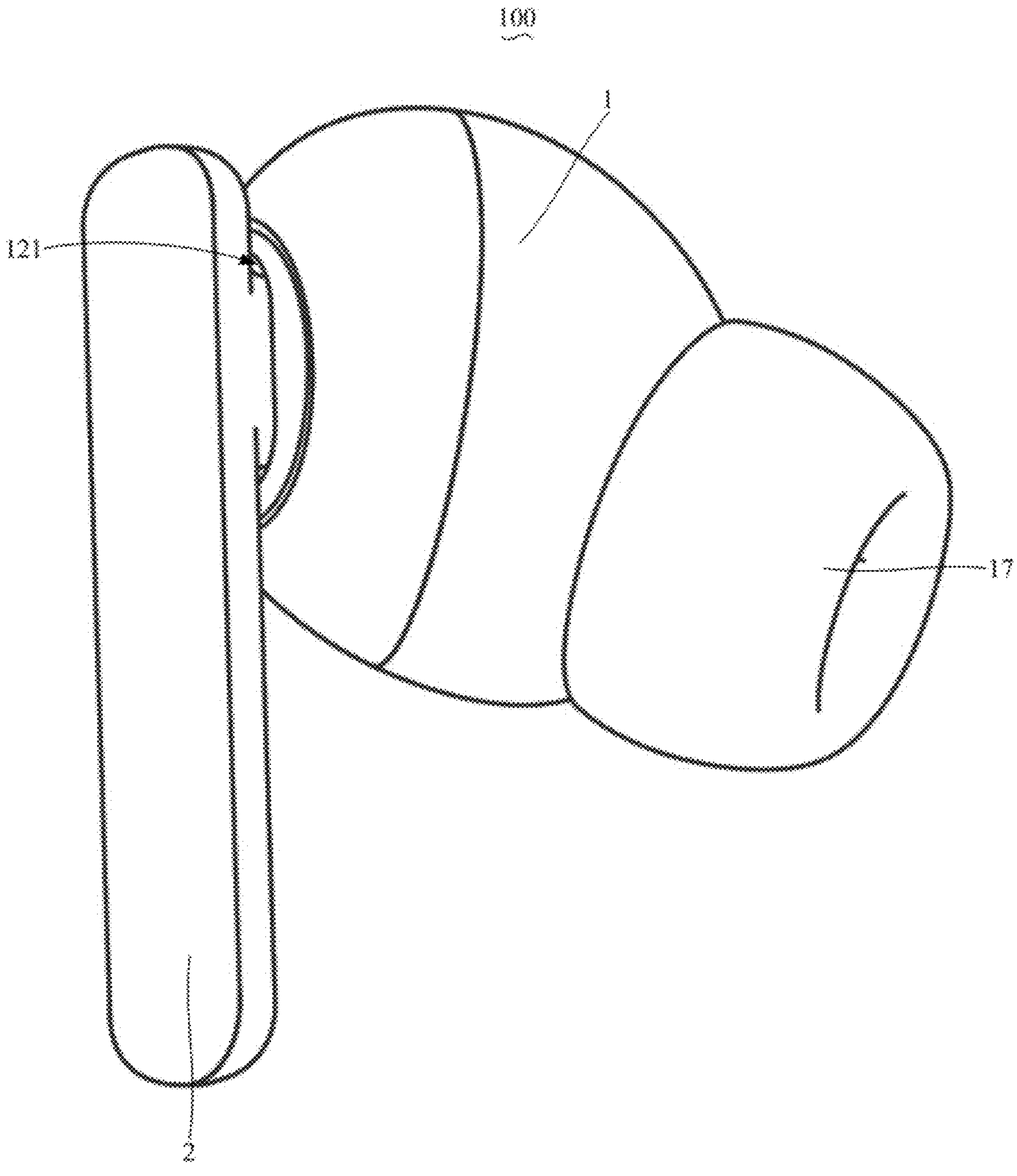
FIG. 1 is a schematic structural view of an earphone according to an embodiment of the present application.

The achievement of the purpose of the present application, functional characteristics and advantages will be further described with reference to the accompanying drawings in conjunction with embodiments.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that if there are directional indications, such as up, down, left, right, front, back, etc, involved in the embodiments of the present application, the directional indications are only used to explain a certain posture as shown in the accompanying drawings. If the specific posture changes, the directional indication also changes accordingly.

Besides, the meaning of "and/or" appearing in the application includes three parallel scenarios. For example, "A and/or B" includes only A, or only B, or both A and B.

In addition, if there are descriptions related to "first", "second", etc. in the embodiments of the present application, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

Currently, the sizes and shapes of earphones in the market are all fixed (except for the earbud caps), so different people have different wearing postures and comfort levels when wearing the same earphone. In the related art, the size and the shape structure of the earphones are fixed and cannot be adjusted. When different users wear the earphones, the wearing comfort of is poor.

At the same time, with the development trend of the true wireless stereo (TWS) earphones, "health" has become a topic of great concern to various earphone brands. Solutions in the "health" field mainly focus on sleep health problems.

Due to the modern competitive lifestyle, people's sleep problems are becoming more and more prominent, and more and more people have sleep problems. However, conventional TWS earphones cannot be converted into sleep earplugs that can solve sleep problems according to user's needs, resulting in the market demand for earphones stopping increasing.

The present application provides an earphone 100. It can be understood that the earphone 100 can be a wired earphone, a wireless earphone, a neck-mounted earphone or a TWS earphone, etc., which is not limited here.

Please referring to FIG. 1 to FIG. 16, in the present application, the earphone 100 includes an earbud structure 1 and an earphone handle rotatably connected to the earbud structure 1 to adjust a wearing posture of the earphone handle 2.

In this embodiment, the earbud structure 1 is a main structure of the earphone 100. The earbud structure 1 includes a shell and a speaker module, a battery, a circuit board 14 and other structures provided in the shell. It can be understood that there is a cavity 111 inside the shell, and the speaker module, the battery, the circuit board 14 and other structures are installed in the cavity 111 of the shell, and the speaker module and battery are electrically connected to the circuit board 14, such as through line connections, welding pads, or contact connections, etc., which are not limited here.

It can be understood that in order to facilitate the speaker module to realize the sound emitting or sounding function of the earphone 100, the shell of the earbud structure 1 is also provided with a sound hole, and the speaker module is provided corresponding to the sound hole. In this embodiment, the earbud structure 1 also includes a rubber plug 17. The rubber plug 17 is sleeved on the shell and around the sound hole, which makes it convenient for the user to insert the rubber plug 17 into the ear. On the one hand, the rubber plug 17 can be a buffer when inserted into the user's ear, so as to prevent the user from pain in the ear resulting from wearing the earphone 100 for too long. On the other hand, the rubber plug 17 can seal and prevent sound from leaking out after being emitted from the sound hole.

In this embodiment, the earphone handle 2 is configured to connect the earbud structure 1, which facilitates the user to take out the earbud structure 1 from the ear through the earphone handle 2, and also facilitates the earbud structure 1 to be connected to earphone cables or neckband structures through the earphone handle 2. It can be understood that in order to reduce a weight of the earbud structure 1 and reasonably arrange the components of earphone 100, the earphone handle 2 includes an earphone handle shell 25, a battery 22, a mic structure and other other components. The earphone handle shell 25 is provided with an accommodating chamber 251, and the battery 22, the mic structure and other components are installed in the accommodating chamber 251 of the earphone handle shell 25.

It can be understood that in order to facilitate the mic structure to realize the sound collection function of the earphone 100, the earphone handle shell 25 is also provided with a sound collection hole, and the mic structure is provided corresponding to the sound collection hole of the earphone handle shell 25. The mic structure is electrically connected to the battery 22, or the mic structure and the battery 22 are electrically connected to the circuit board 14 in the earbud structure 1. When the earphone 100 is the wireless earphone, the Bluetooth earphone or the TWS earphone, in order to conveniently power supply or charge the battery 22 of the earphone handle 2 and/or the battery or the circuit board 14 of the earbud structure 1, the earphone handle 2 is also provided with a charging structure, a charging contacting piece or an antenna, etc., which are not limited here.

In this embodiment, the earphone handle 2 is rotatably connected to the earbud structure 1. It can be understood that the rotational connection of the earphone handle 2 and the earbud structure 1 can be a hole-shaft matching structure, a hinge structure or a ball head rotation structure, as long as the earphone handle 2 can be rotatably connected to the earbud structure 1, which is not limited here.

The earphone 100 of the present application is a two-part structure, including the earbud structure 1 and the earphone handle 2 rotatably connected to the earbud structure 1, so that when the user wears the earphone 100, after the earbud structure 1 of the earphone 100 is inserted into the ear, a relative angle between the earphone handle 2 and the earbud structure 1 can be adjusted to adjust the wearing posture of the earphone handle 2, thereby improving the user's wearing comfort and solving the problem of wearing discomfort of different users caused by differences in ear size and shape.

It can be understood that to facilitate converting the earphone 100 into the earbud structure 1, the earphone handle 2 and the earbud structure 1 of the earphone 100 can be a detachable connection structure, such as a snap fit, a plug fit, a threaded connection, a screw connection or a pin connection, as long as to realize the detachable connection of the earphone handle 2 and the earbud structure 1 of the earphone 100, which is not limited here. In this way, it is convenient to convert the earphone 100 from regular use into the sleep earplug. From the perspective of healthy sleep, after the earphone handle 2 is removed, the earphone 100 becomes the sleep earplug, which reduces the impact of the earphone handle on sleep and can help people with sleep problems to improve their sleep quality.

In this embodiment, the earphone handle 2 can be rotatably and detachably connected to the earbud structure 1 of the earphone 100, which is not limited here.

In an embodiment, one of the earphone handle 2 and the earbud structure 1 is provided with a rotating portion 21, and the other one of the earphone handle 2 and the earbud structure 1 is provided with a rotating groove 121. The rotating portion 21 is rotatably provided in the rotating groove 121, so that the earphone handle 2 is rotatably connected to the earbud structure 1.

In this embodiment, the rotating portion 21 and the rotating groove 121 are respectively provided on the earphone handle 2 and the earbud structure 1, so that the earphone handle 2 is rotatably connected to the earbud structure 1 through the rotating portion 21 being rotatably provided in the rotating groove 121. It can be understood that the earphone handle 2 is provided with the rotating portion 21 and the earbud structure 1 is provided with the rotating groove 121; or the earphone handle 2 is provided with the rotating groove 121 and the earbud structure 1 is provided with the rotating portion 21, which is not limited here.

It can be understood that the rotating portion 21 can be a ball head structure, a structure provided with a shaft hole, or a hinged connection portion, etc., and the rotating groove 121 is correspondingly configured as a spherical rotating groove structure, a groove structure provided with a rotating shaft, or a structure configured to accommodate and connect to the hinged connection, etc., which are not limited here.

In an embodiment, as shown in FIG. 4 to FIG. 16, one end of the earphone handle 2 is provided with the rotating portion 21, and the earbud structure 1 is provided with the rotating groove 121. It can be understood that the end of the earphone handle 2 is convexly provided with a rotating portion 21, that is, the earphone handle shell 25 is provided with a convex structure, and the shell of the earbud structure 1 is provided with a groove structure, or the groove structure is formed by the shell and the rotating shell, which is not limited here.

In this embodiment, the plane where a notch of the rotating groove 121 is located is defined as the reference plane, and the axis of the earphone handle 2 extends along the extension direction of the earphone handle 2. When the earphone handle 2 rotates relative to the earbud structure 1, the angle between the axis of the earphone handle 2 and the reference plane is θ1, and 0≤θ1≤45°.

It can be understood that when the earphone handle 2 rotates relative to the earbud structure 1 in the rotating groove 121 through the rotating portion 21, the angle θ1 between the axis of the earphone handle 2 and the reference plane may vary in the range of 0 to 45°, thereby adjusting the connection angle between the earphone handle 2 and the earbud structure 1, which is suitable for users to wear and improves wearing comfort.

Figure 2:
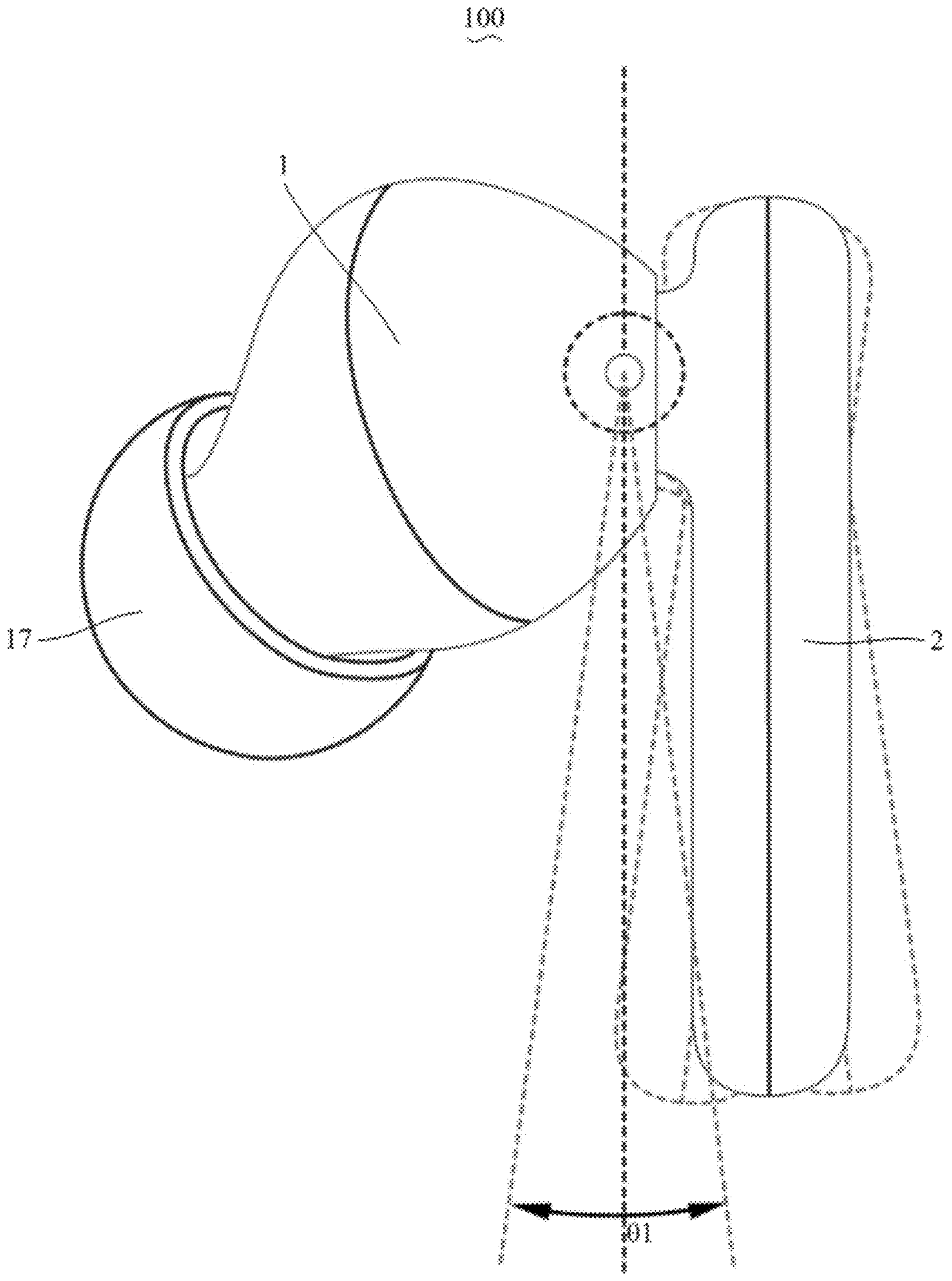
FIG. 2 is a schematic structural view of an earphone handle rotating relative to an earbud structure according to an embodiment of the present application.
Figure 3:
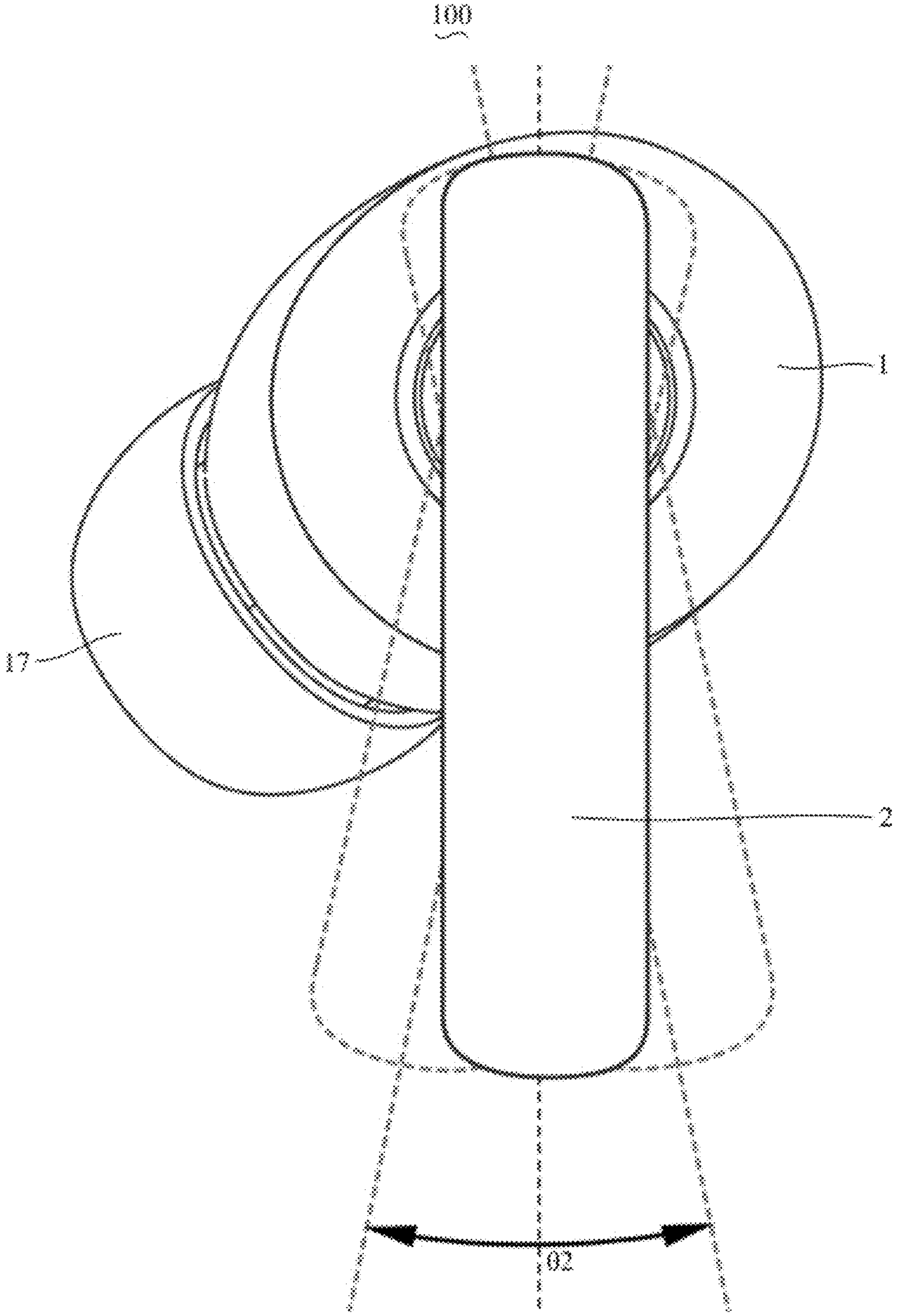
FIG. 3 is a schematic structural view of the earphone handle rotating relative to the earbud structure according to an embodiment of the present application.
Figure 4:
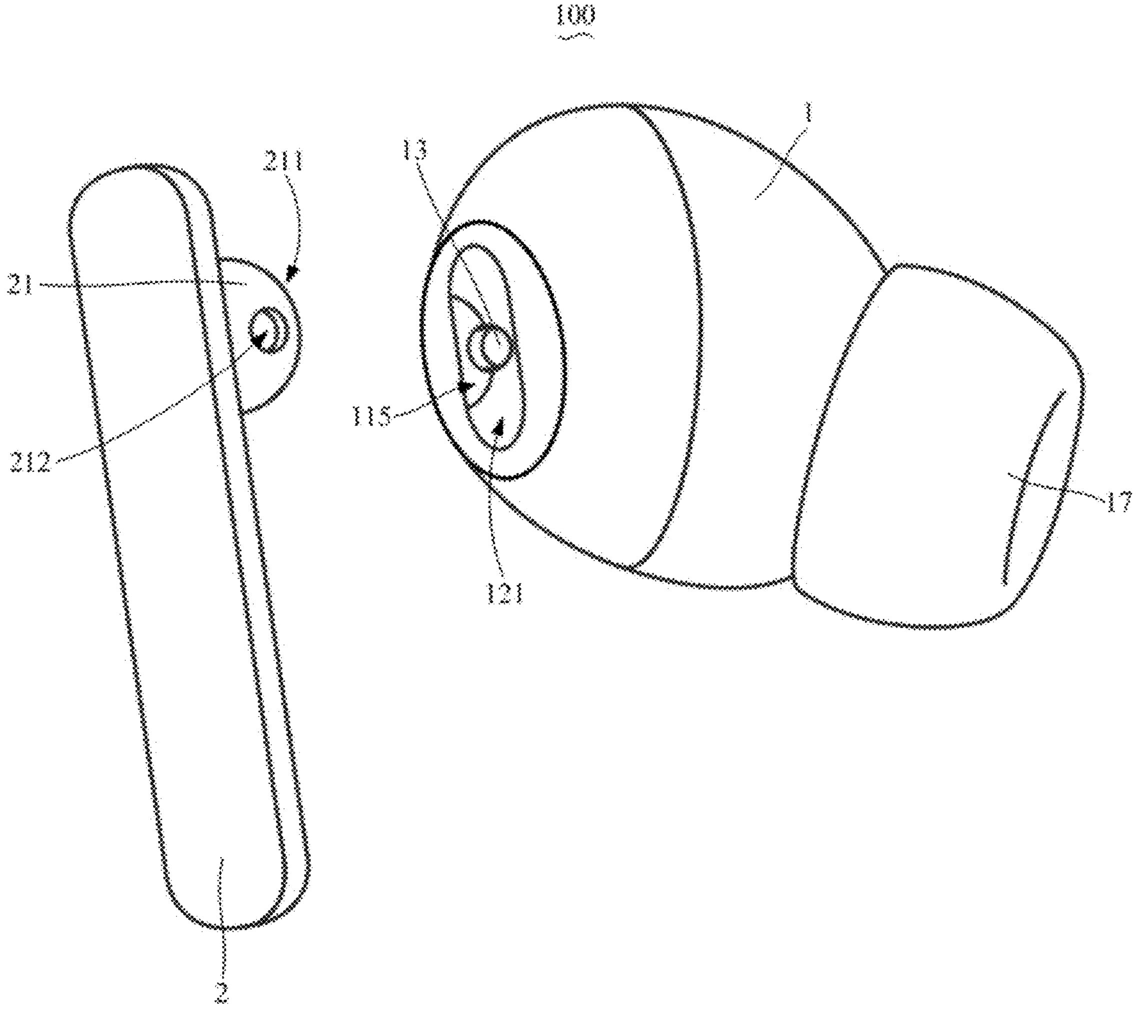
FIG. 4 is a schematic separative structural view of the earphone handle and the earbud structure according to an embodiment of the present application.
Figure 5:
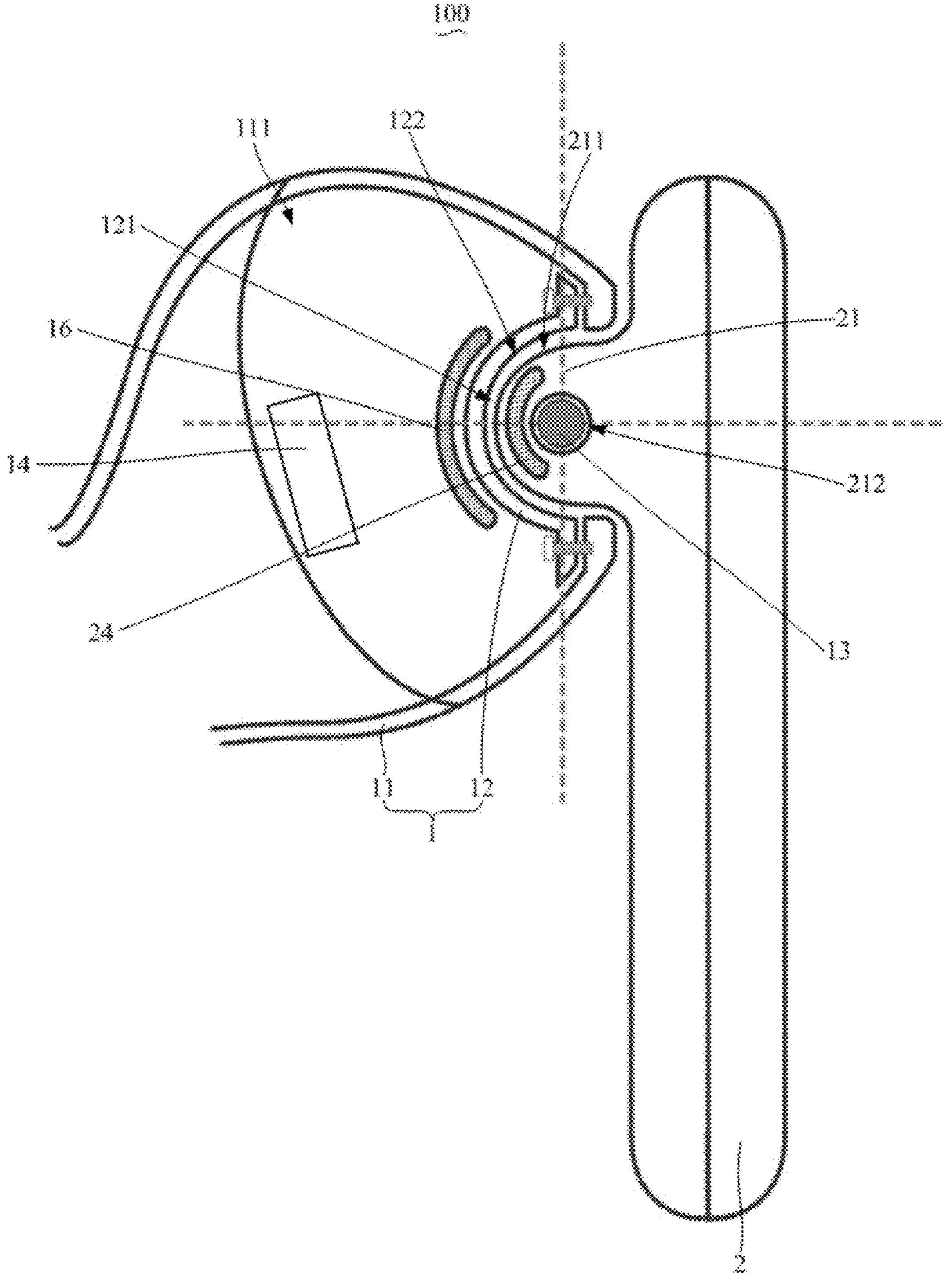
FIG. 5 is a schematic cross-sectional view of the earphone according to an embodiment of the present application.
Figure 6:
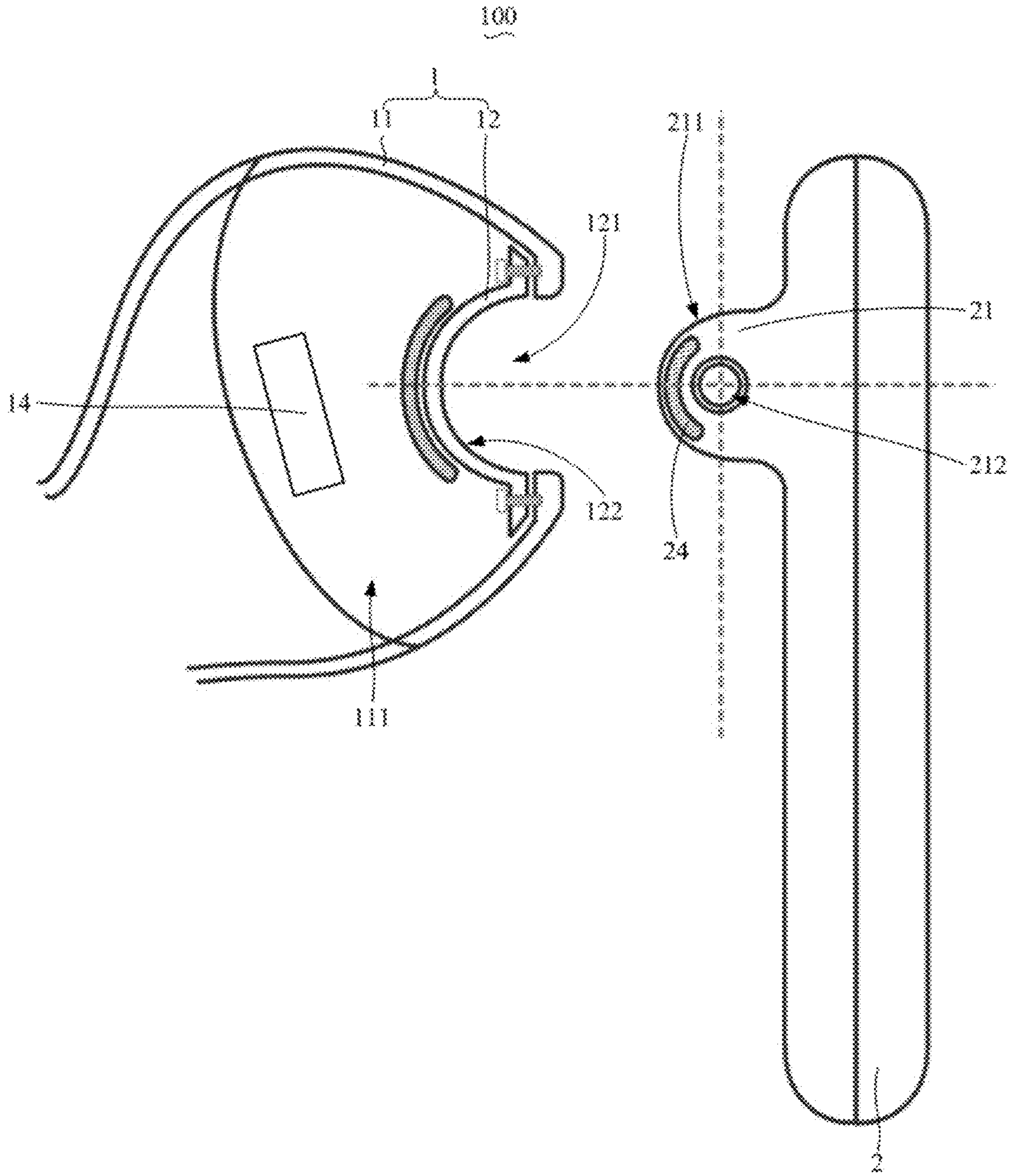
FIG. 6 is a schematic separative structural cross-sectional view of the earphone handle and the earbud structure according to an embodiment of the present application.
Figure 13:
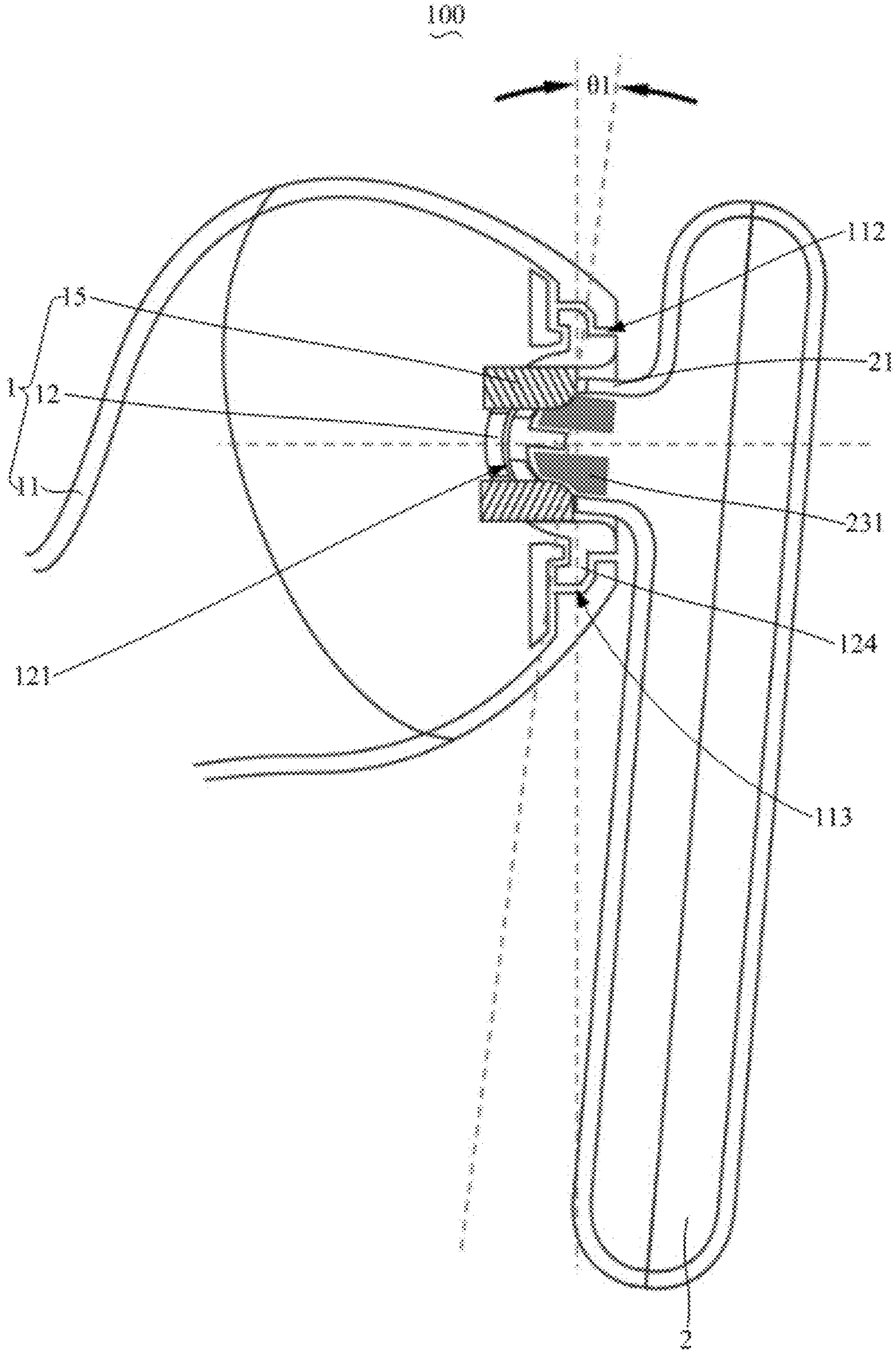
FIG. 13 is a cross-sectional view of the earphone handle rotating relative to the earbud structure according to an embodiment of the present application.
Figure 14:
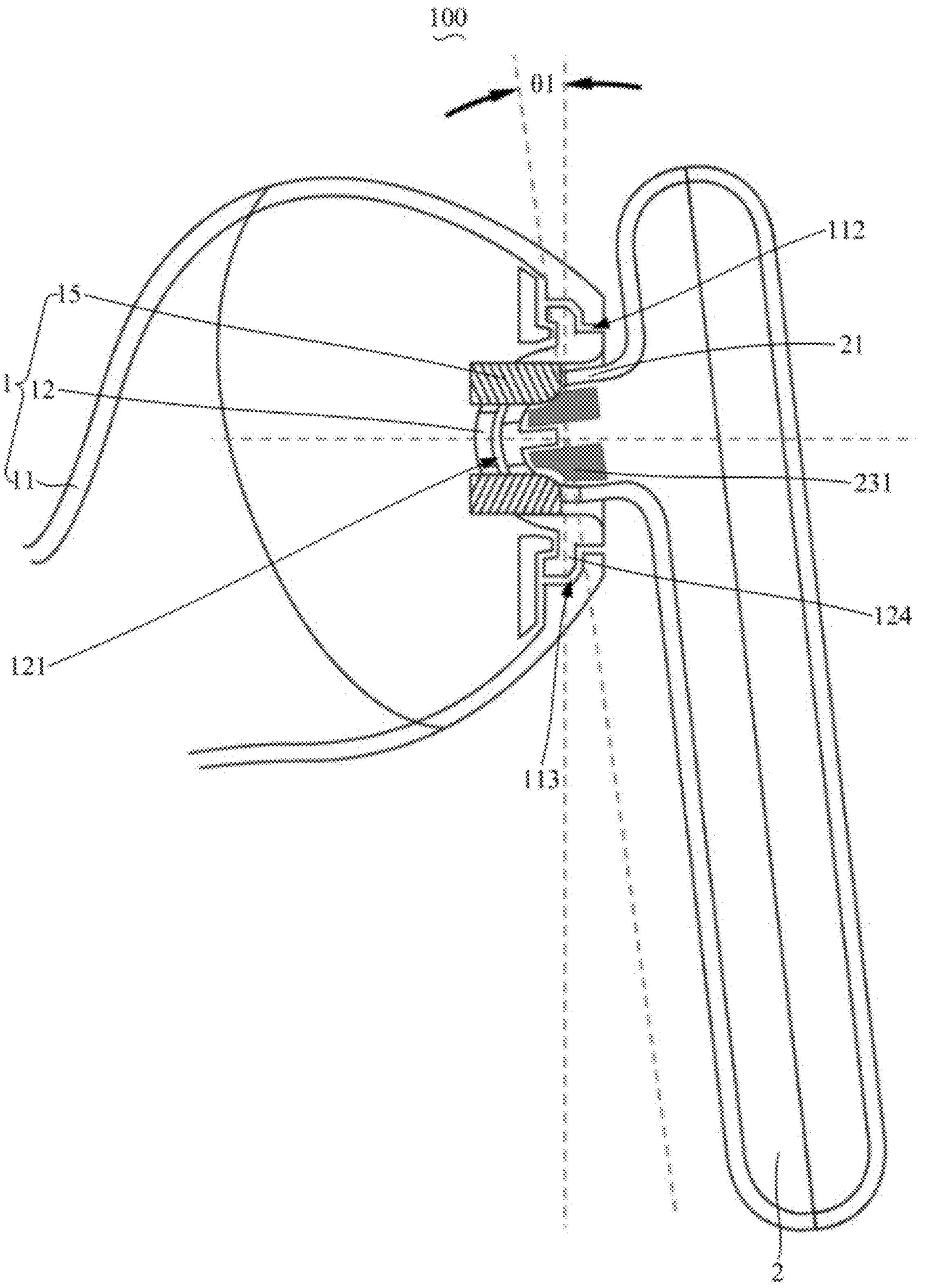
FIG. 14 is a cross-sectional view of the earphone handle rotating relative to the earbud structure according to an embodiment of the present application.

In this embodiment, as shown in FIG. 2, FIG. 13 and FIG. 14, the axis of the earphone handle 2 rotates around the rotating portion 21 with the rotating portion 21 as the rotation point, so that the two ends of the earphone handle 2 swing relative to the plane where the notch of the rotating groove 121 is located, that is, the axis of the rotation of the earphone handle 2 around the rotating portion 21 is parallel to the reference plane formed by the plane where the notch of the rotating groove 121 is located. In an embodiment, the angle θ1 between the axis of earphone handle 2 and the reference plane is 0, 1°, 2°, 3°, 4°, 5°, 6°, 7°, 8°, 9°, 10°, 11°, 12°, 13°, 14°, 15°, 18°, 20°, 23°, 25°, 28°, 30°, 35°, 40°, 45°, etc., which is not limited here.

In an embodiment, the rotating portion 21 is provided with a shaft hole 212, the earbud structure 1 is provided with an abutting shaft 13 at least partially located within the rotating groove 121, and the abutting shaft 13 is rotatably provided in the shaft hole 212.

In this embodiment, as shown in FIG. 4 to FIG. 9, the shaft hole 212 is provided on the rotating portion 21, and the abutting shaft 13 is provided in the rotating groove 121, so that the abutting shaft 13 is rotatably provided in the shaft hole 212, and the hole shaft is configured to cooperate with the rotatable connection of the earphone handle 2 and the earbud structure 1. It can be understood that the shaft hole 212 may have a through hole structure or a counterbore structure, which is not limited here.

Figure 7:
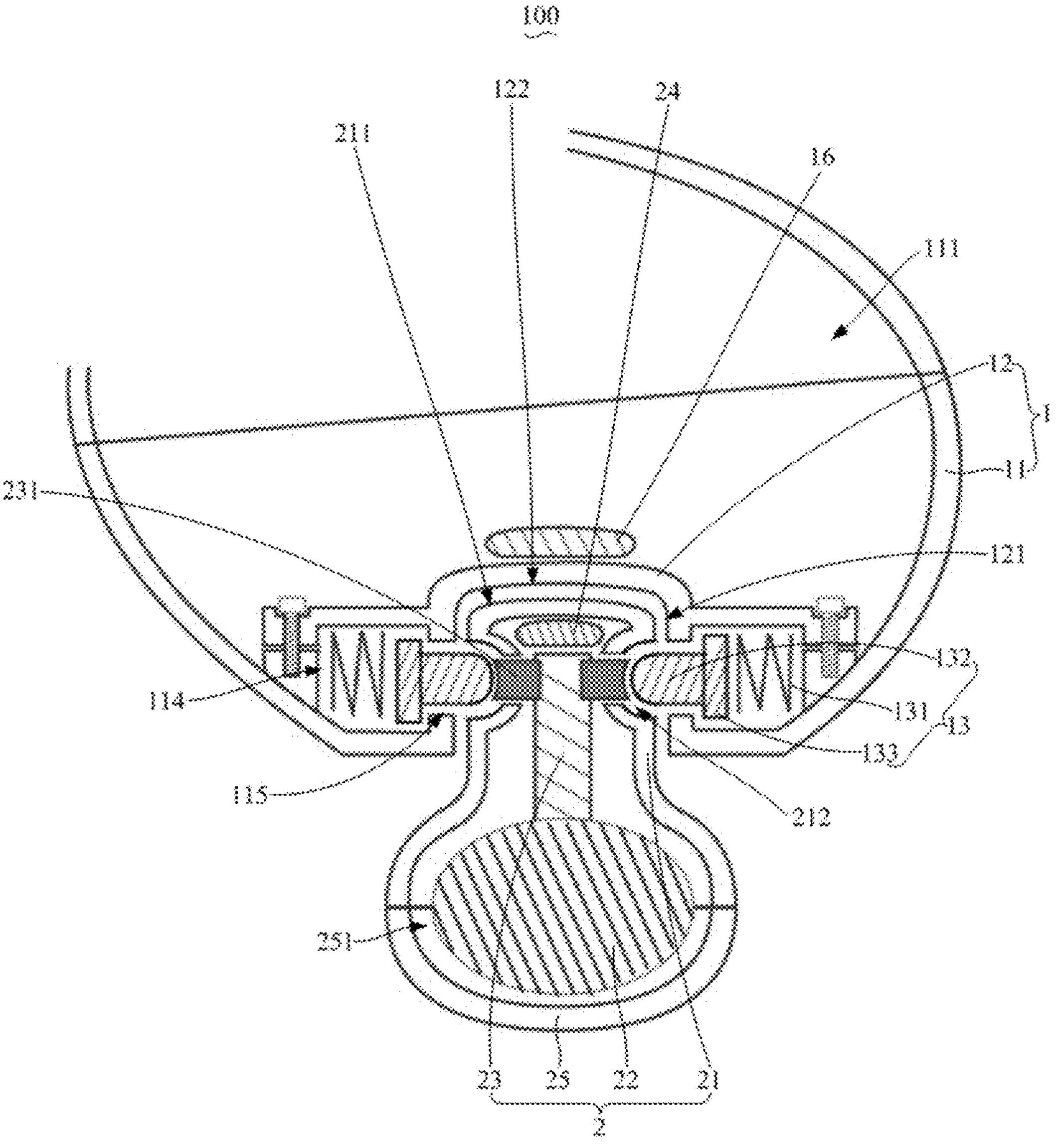
FIG. 7 is a schematic cross-sectional view of the earphone from another perspective according to an embodiment of the present application.
Figure 8:
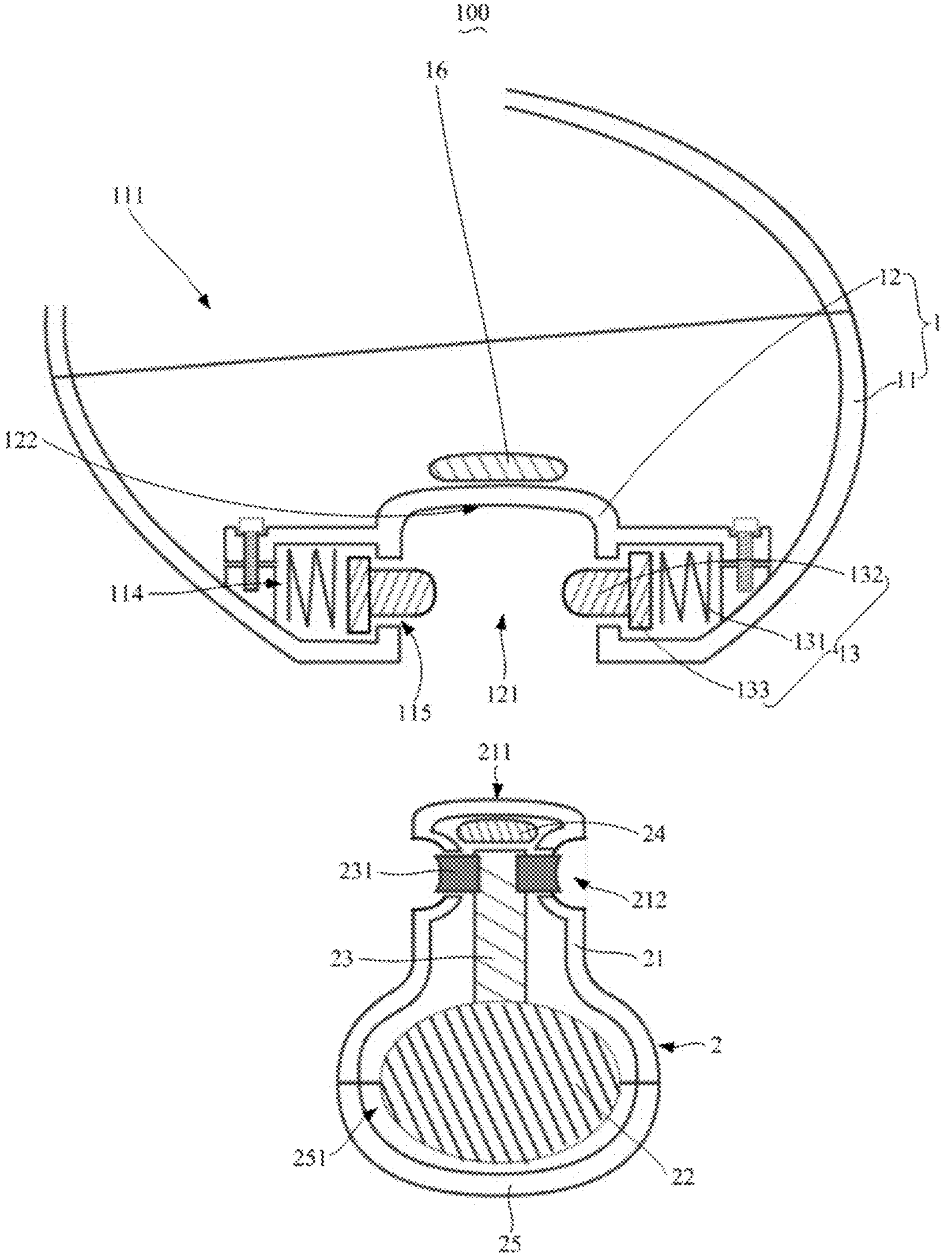
FIG. 8 is a schematic separative structural cross-sectional view of the earphone handle and the earbud structure from another perspective according to an embodiment of the present application.
Figure 9:
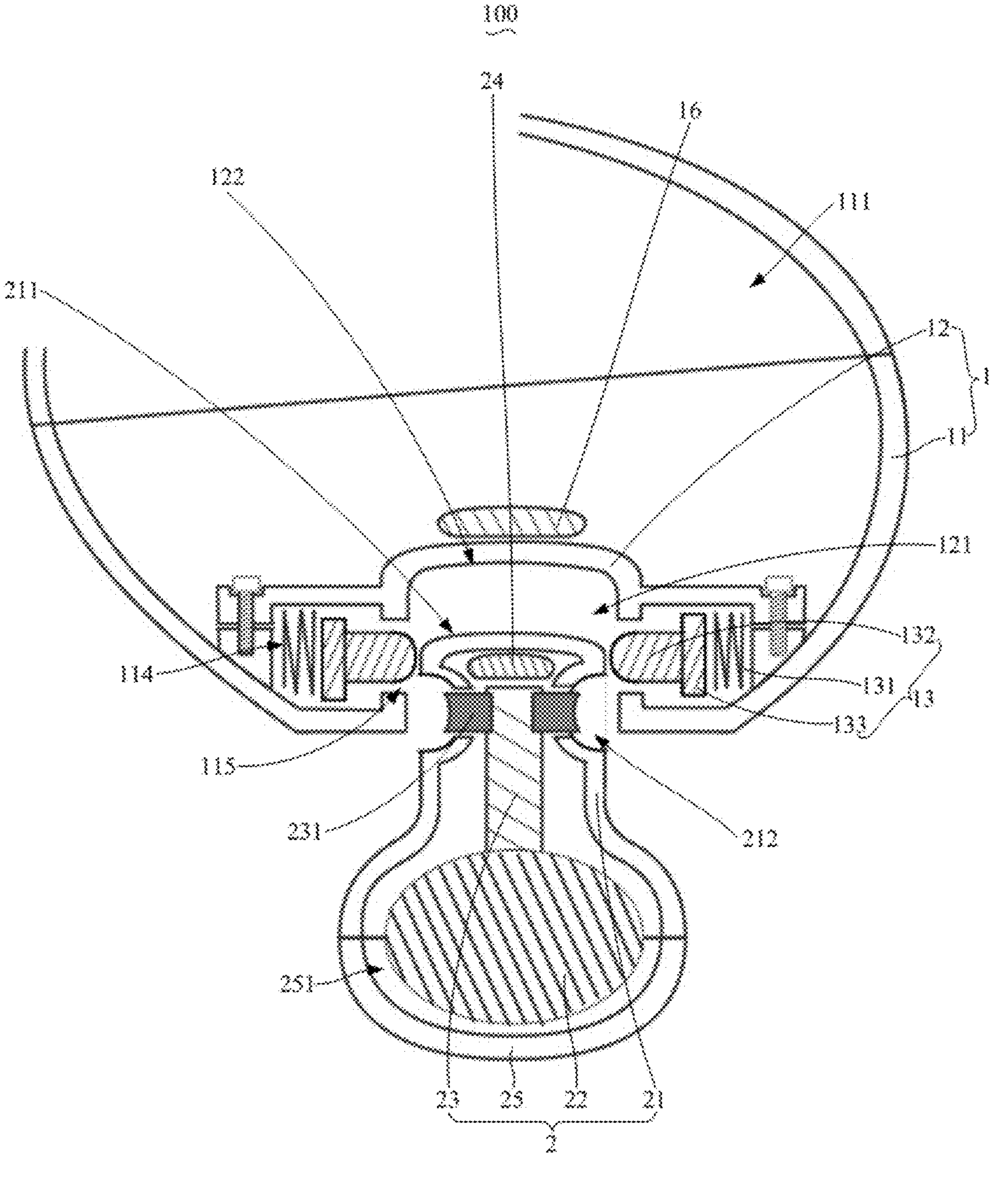
FIG. 9 is a cross-sectional view of the earphone handle inserted into the earbud structure according to an embodiment of the present application.
Figure 10:
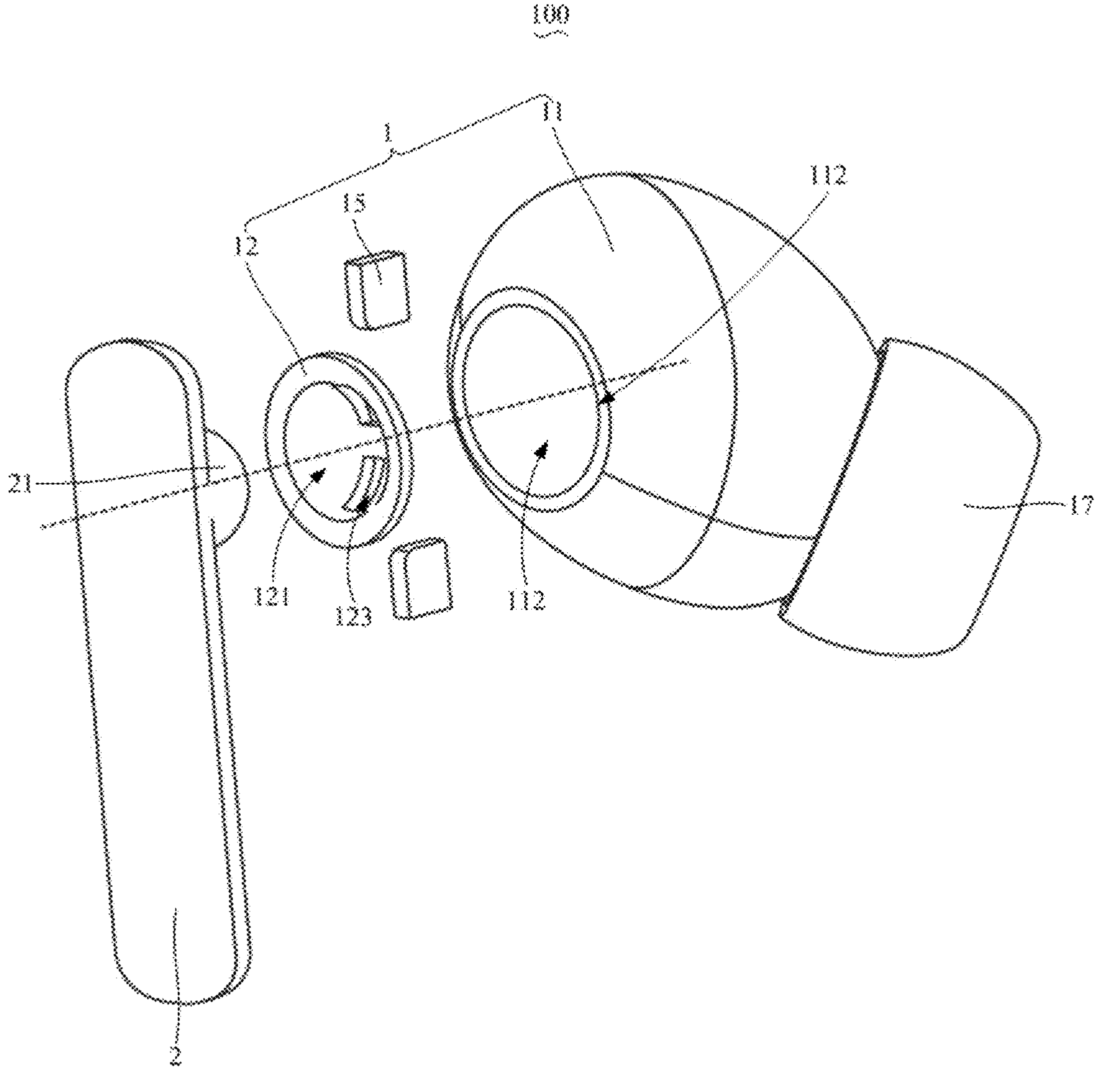
FIG. 10 is an exploded schematic view of the earphone according to an embodiment of the present application.
Figure 11:
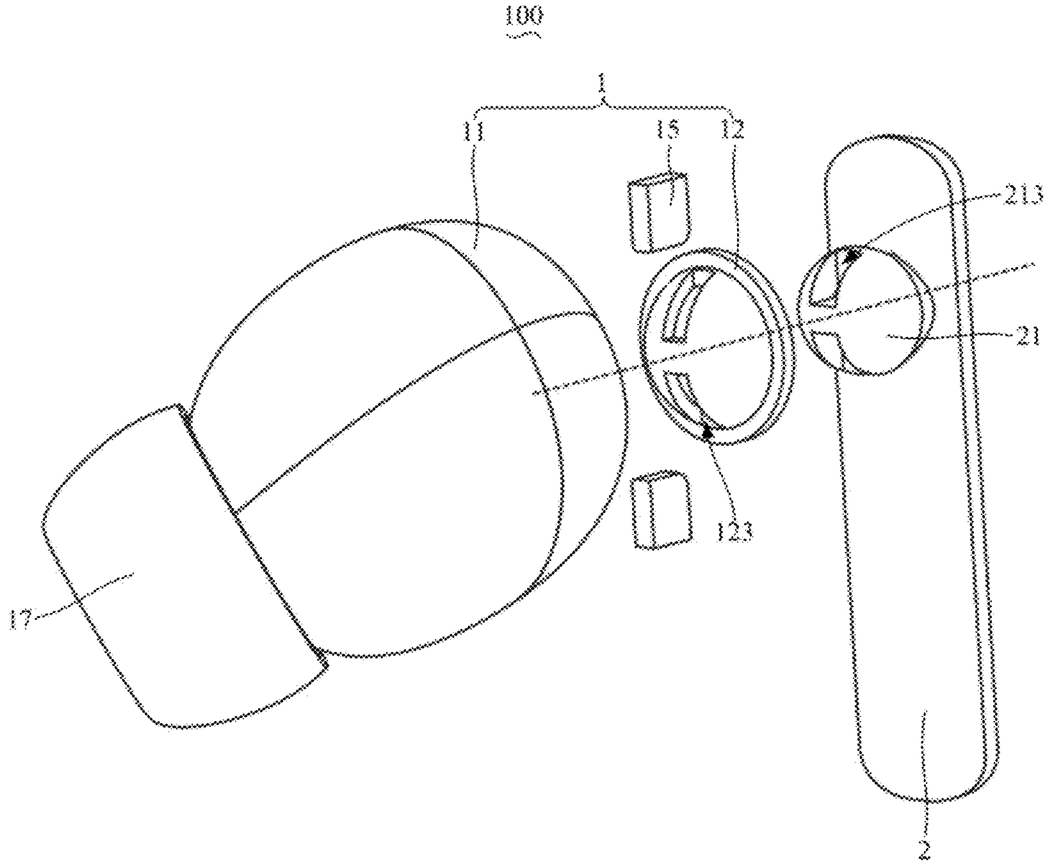
FIG. 11 is a schematic exploded view of the earphone from another perspective according to an embodiment of the present application.

In an embodiment, as shown in FIG. 7 to FIG. 9, two abutting shafts 13 are provided, and the two abutting shafts 13 are symmetrical and located on opposite sides of the rotating portion 21. The shaft holes 212 are provided on opposite sides of the rotating portion 21, and each of the abutting shafts 13 is rotatably provided in the corresponding shaft hole 212.

It can be understood that the two abutting shafts 13 are symmetrical and located on opposite sides of the rotating portion 21. The shaft holes 212 are provided on opposite sides of the rotating portion 21, and each of the abutting shafts 13 is rotatably provided in the corresponding shaft hole 212. In this way, the rotation of the earphone handle 2 relative to the earbud structure 1 is more stable.

In this embodiment, one end of the abutting shaft 13 cooperated with the shaft hole 212 is a spherical round head structure, and the shaft hole 212 is a spherical groove structure, so that the spherical round head structure of the abutting shaft 13 is matched with the structure of the shaft hole 212, which can not only realize the stable installation of earphone handle 2 and earbud structure 1, but can also realize the rotation connection of earphone handle 2 and earbud structure 1. In other embodiments, a diameter of the shaft hole 212 can also be slightly larger than a diameter of the abutting shaft 13, thereby facilitating the rotation of the abutting shaft 13 to a wall of the shaft hole 212.

It can be understood that in order to facilitate the detachable connection of the earphone handle 2 and the earbud structure 1, the abutting shaft 13 can be the convex structure with the spherical round head structure, so that the earphone handle 2 can be rotatably and detachably connected to the earbud structure 1, which is not limited here.

In an embodiment, the rotating portion 21 is also provided with a first convex arc surface 211, and a wall of the rotating groove 121 is formed with a first concave arc surface 122 matched with the first convex arc surface 211.

It can be understood that, as shown in FIG. 4 to FIG. 9, the rotating portion 21 is also provided with the first convex arc surface 211 between the two shaft holes 212, and the wall of the rotating groove 121 is formed with the first concave arc surface 122 matched with the first convex arc surface 211. On the one hand, the connection of earphone handle 2 and earbud structure 1 is tighter. On the other hand, the rotation of the earphone handle 2 to the earbud structure 1 is easier, which is not limited here. In an embodiment, the first convex arc surface 211 is a semicircular convex arc surface, and the first concave arc surface 122 is a semicircular concave arc surface, which is not limited here.

In an embodiment, the earbud structure 1 is also provided with a fixed chamber 114 and a sliding port 115. The fixed chamber 114 is communicated with the rotating groove 121 through the sliding port 115. The abutting shaft 13 includes an elastic member 131 and a connector 132. One end of the elastic member 131 is connected to a wall of the fixed chamber 114, the other end of the elastic member 131 is connected to one end of the connector 132, and the other end of the connector 132 extends into the rotating groove 121 through the sliding port 115 and is rotatably provided in the shaft hole 212.

In this embodiment, as shown in FIG. 4, and FIG. 7 to FIG. 9, the earbud structure 1 is provided with two fixed chambers 114 and two sliding ports 115. The two fixed chambers 114 are located on opposite sides of the rotating groove 121 and are symmetrical. It can be understood that the earbud structure 1 is provided with the two fixed chambers 114 and the two sliding ports 115. The two fixed chambers 114 are located on opposite sides of the rotating groove 121 and are symmetrical, and each of the fixed chambers 114 is connected to the rotating groove 121 through the sliding port 115. That is, the two fixed chambers 114 are located on opposite sides of the rotating portion 21, so that the two abutting shafts 13 are installed in the two fixed chambers 114 through the two sliding ports 115 respectively.

It can be understood that each of the abutting shafts 13 is a two-part structure, including the elastic member 131 and the connector 132, one end of the elastic member 131 is connected to the wall of the fixed chamber 114, the other end of the elastic member 131 is connected to one end of the connector 132, and the other end of the connector 132 extends into the rotating groove 121 through the sliding port 115 and is rotatably provided in the shaft hole 212, so that the elastic member 131 is configured to provide an elastic expansion and contraction force to the connector 132. In this way, the connector 132 can be rotatably provided in the shaft hole 212 to realize the rotation connection of the earphone handle 2 and earbud structure 1. The elastic member 131 can provide the elastic expansion and contraction force to the connector 132, so that the shaft hole 212 of the rotating portion 21 of the earphone handle 2 can be separated from the connector 132 to realize the detachable connection of the earphone handle 2 and the earbud structure 1.

In order to improve the stability of the connection of earphone handle 2 and earbud structure 1, in an embodiment, as shown in FIG. 5 to FIG. 9, FIG. 15, and FIG. 16, the earbud structure 1 is provided with a first magnetic member 16, and the earphone handle 2 is provided with a second magnetic member 24 attracted to the first magnetic member 16.

It can be understood that the first magnetic member 16 can be provided in the rotating groove 121, or the first magnetic member 16 can be provided in the cavity 111 and is abutted against the outer wall of the rotating groove 121. The second magnetic member 24 can be provided on the outer wall or inside the rotating portion 21. As long as the first magnetic member 16 and the second magnetic member 24 can attract each other to achieve the stable connection of the earphone handle 2 and the earbud structure 1 when the rotating portion 21 of the earphone handle 2 is accommodated in the rotating groove 121, which is not limited here.

In an embodiment, as shown in FIG. 5 to FIG. 9, the first magnetic member 16 is located in the cavity 111 of the earbud structure 1 and is connected to the outer wall of the rotating groove 121 corresponding to the first concave arc surface 122. The second magnetic member 24 is located in the rotating portion 21 and corresponds to the first convex arc surface 211 of the rotating portion 21. In an embodiment, the first magnetic member 16 is provided in an arc along the outer wall of the first concave arc surface 122, and the second magnetic member 24 is provided in an arc along the inner wall of the first convex arc surface 211, so that the first magnetic member 16 can always be attracted and connected to the second magnetic member 24 when the first convex arc surface 211 of the earphone handle 2 rotates around the first concave arc surface 122 of the rotating groove 121.

Figure 15:
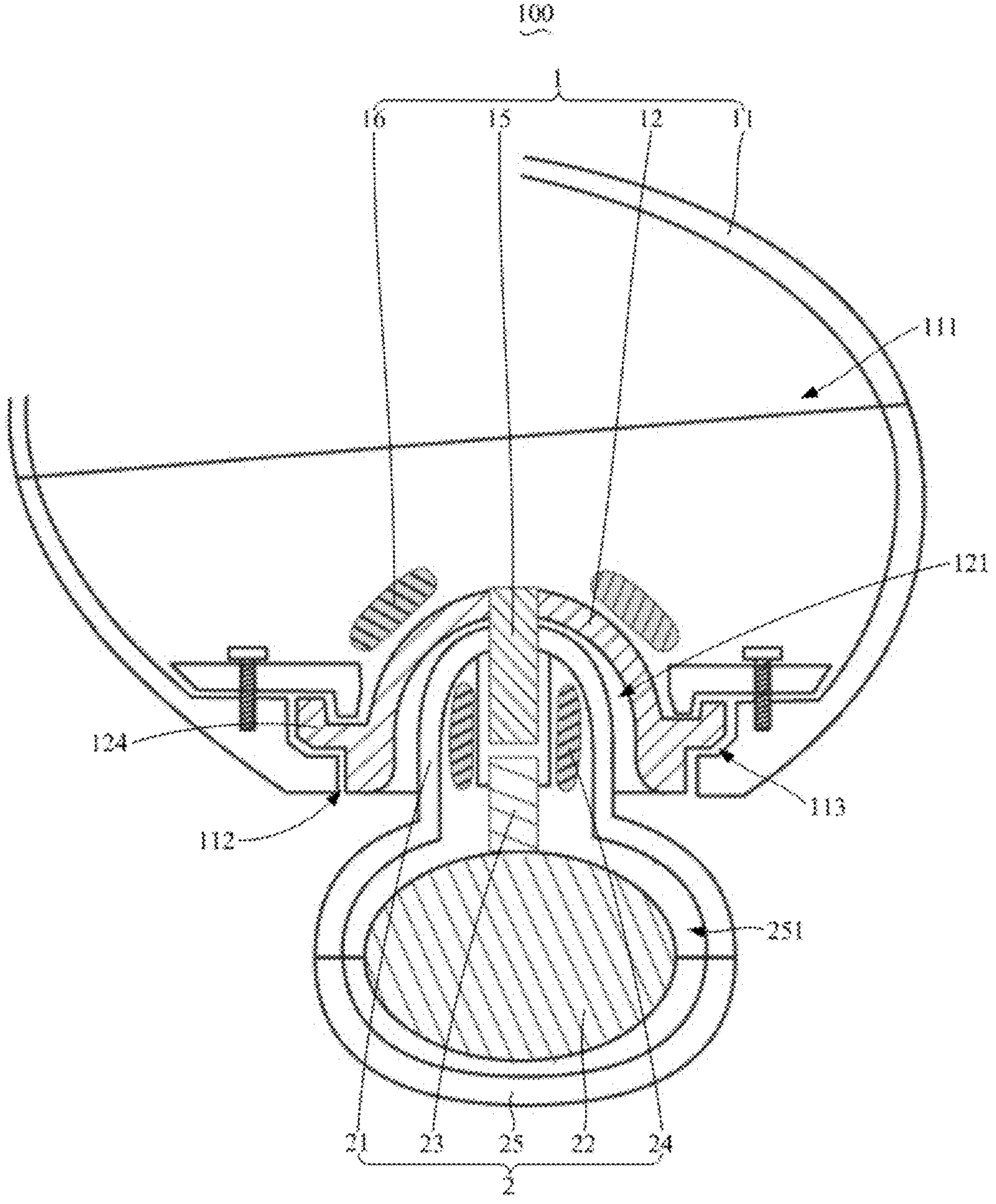
FIG. 15 is a cross-sectional view of the earphone from another perspective according to an embodiment of the present application.
Figure 16:
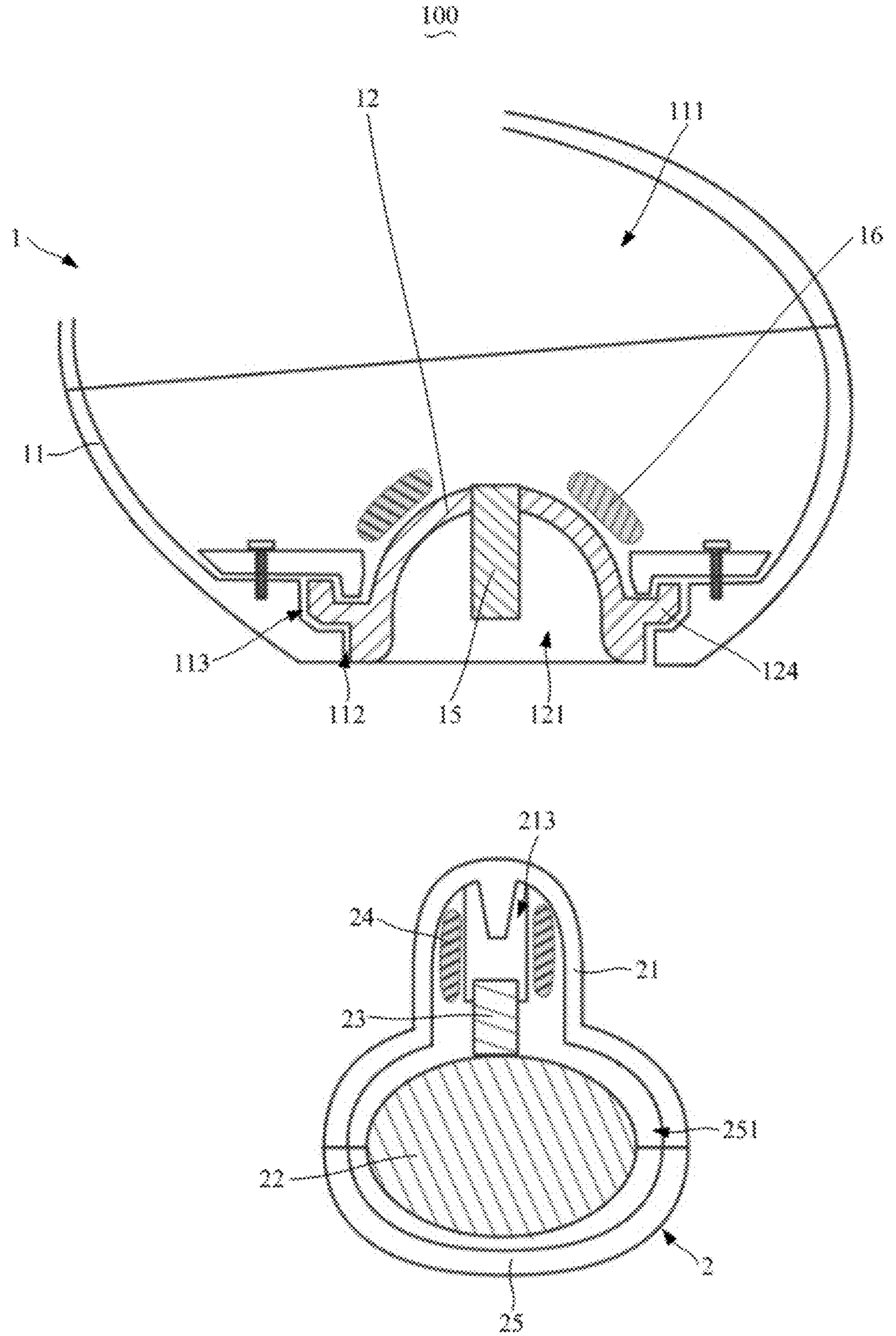
FIG. 16 is schematic separative structural cross-sectional view of the earphone handle and the earbud structure from another perspective according to an embodiment of the present application.

In an embodiment, as shown in FIG. 15 and FIG. 16, the first magnetic member 16 is in the cavity 111 of the earbud structure 1 and is connected to the outer wall of the spherical groove-shaped rotating groove 121. The second magnetic member 24 is in the rotating portion 21 and is connected to the inner wall of the spherical convex-shaped rotating portion 21. In an embodiment, two first magnetic members 16 are provided, and the two first magnetic members 16 are respectively provided on both sides of the two connecting members 15. Two second magnetic members 24 are provided, and the two second magnetic members 24 are respectively provided on both sides of the clamping groove 213. In an embodiment, the first magnetic member 16 is provided in the arc along the spherical outer wall of the rotating shell 12, and the second magnetic member 24 is provided in the arc along the spherical convex inner wall of the rotating portion 21, so that the first magnetic member 16 can always be attracted and connected to the second magnetic member 24 when the earphone handle 2 rotates in the rotating groove 121.

In an embodiment, as shown in FIG. 7 to FIG. 9, one end of the connector 132 adjacent to the elastic member 131 is provided with a blocking convex 133, and the blocking convex 133 is abutted against a periphery of the sliding port 115. It can be understood that the blocking convex 133 is provided on the connector 132, and the blocking convex 133 is configured to abut against the periphery of the sliding port 115 to prevent the connector 132 from completely detaching from the fixed chamber 114.

It can be understood that the blocking convex 133 can be configured as multiple convex structures or an annular structure, that is, the multiple convex structures or the annular structure are provided around the end of the connector 132 adjacent to the elastic member 131. In an embodiment, an aperture of the sliding port 115 is smaller than an outer diameter of the annular blocking convex 133.

In an embodiment, as shown in FIG. 5 to FIG. 9, the earphone handle 2 is provided with the battery 22, the rotating portion 21 is provided with a conductive column 23 electrically connected to the battery 22, and the conductive column 23 is provided with a contacting piece 231 corresponding to the shaft hole 212. The earbud structure 1 is provided with the circuit board 14, the abutting shaft 13 is electrically connected to the circuit board 14, and the abutting shaft 13 is rotatably provided in the shaft hole 212 and is abutted against the contacting piece 231.

In this embodiment, the conductive column 23 is provided in the rotating portion 21, and the contacting piece 231 is provided in the conductive column 23 corresponding to each of the shaft holes 212, and the abutting shaft 13 is electrically connected to the circuit board 14, so that each of the abutting shafts 13 is rotatably provided in the shaft hole 212 and is abutted against the contacting piece 231, so as to achieve the electrical connection and conduction between the battery 22 in the earphone handle 2 and the circuit board 14 in the earbud structure 1.

It can be understood that the elastic member 131 of the abutting shaft 13 is electrically connected to the circuit board 14, and the connector 132 is abutted against the contacting piece 231, so that the circuit board 14 is electrically connected to the battery 22 through the elastic member 131, the connector 132, the contacting piece 231 and the conductive column 23. In an embodiment, the elastic member 131 is a metal conductive elastic member, and the elastic member 131 can be a spring structure.

In an embodiment, as shown in FIG. 10 to FIG. 16, the rotating portion 21 is a spherical convex portion, and the rotating groove 121 is a spherical groove matched with the spherical convex portion. It can be understood that the rotating portion 21 is the spherical convex portion and the rotating groove 121 is the spherical groove, so that when the rotating portion 21 is accommodated in the rotating groove 121, the spherical convex portion matches with the spherical groove, and the earphone handle 2 can rotate relative to the earbud structure 1 through the rotating portion 21 in the rotating groove 121.

In an embodiment, as shown in FIG. 10 to FIG. 14, the rotating portion 21 is provided with a clamping groove 213, and the earbud structure 1 is also provided with a connecting member 15 at least partially located within the rotating groove 121, and the connecting member 15 is movably clamped in the clamping groove 213.

It can be understood that the clamping groove 213 is provided in the rotating portion 21 and the connecting member 15 is provided in the rotating groove 121, so that the connecting member 15 is movably clamped in the clamping groove 213 to realize the connection of the earphone handle 2 and the earbud structure 1.

In this embodiment, the clamping groove 213 can be an arc-shaped groove, so that when the earphone handle 2 rotates relative to the earbud structure 1, the connecting member 15 can move along the clamping groove 213.

In an embodiment, as shown in FIG. 10 to FIG. 14, two connecting members 15 are provided. The two connecting members 15 are symmetrical and along the extension direction of the earphone handle 2. The rotating portion 21 is provided with a clamping groove 213 corresponding to the connecting member 15.

It can be understood that the two connecting members 15 are symmetrical and along the extension direction of the earphone handle 2, and the two clamping grooves 213 are provided on the rotating portion 21, so that each of the connecting members 15 is movably clamped in the clamping groove 213. The clamping groove 213 can be the arc-shaped groove, that is, one end of the clamping groove 213 approaches one end of the other clamping groove 213, and the other end of the clamping groove 213 moves away from the end of the other clamping groove 213, that is, the extending direction of the two clamping grooves 213. The spherical surface of the rotating surface 21 is provided in a semicircular arc shape, that is, the projection of the two clamping grooves 213 on the earphone handle 2 is in the extension direction of the earphone handle 2, so that when the earphone handle 2 rotates relative to the earbud structure 1, the two connecting members 15 respectively move along the two clamping grooves 213.

Assuming that the plane where the notch of the rotating groove 121 is located is the reference plane, and the axis of the earphone handle 2 extends along the extension direction of earphone handle 2. When the earphone handle 2 rotates relative to earbud structure 1, the angle between the axis of earphone handle 2 and the reference plane is θ1, and 0≤1≤45°.

In an embodiment, the earbud structure 1 is also provided with the cavity 111 and the circuit board 14 located in the cavity 111. The wall of the rotating groove 121 is provided with a via hole 123 communicated with the cavity 111. One end of the connecting member 15 extends into the cavity 111 through the via hole 123 and is electrically connected to the circuit board 14. The earphone handle 2 is provided with the battery 22, the rotating portion 21 is provided with the conductive column 23 electrically connected to the battery 22, and the conductive column 23 is provided with the contacting piece 231 corresponding to the clamping groove 213. The connecting member 15 is movably clamped in the clamping groove 213, and is abutted against the contacting piece 231.

In this embodiment, the cavity 111 is provided in the earbud structure 1, so that cavity 111 is configured to install and fix the speaker module, the battery, the circuit board 14 and other structures, etc. The via hole 123 communicated with the cavity 111 is opened on the wall of rotating groove 121, and the end of the connecting member 15 extends into the cavity 111 through via hole 123, thereby facilitating the electrical connection with circuit board 14. At the same time, the via hole 123 is beneficial to the installation fixation of the connecting member 15 and the electrical connection of the connecting member 15 and the circuit board 14.

It can be understood that the battery 22 is provided in the earphone handle 2, and the conductive column 23 electrically connected to the battery 22 is provided in the rotating portion 21, so that the conductive column 23 is provided with the contacting piece 231 corresponding to the clamping groove 213, the connecting member 15 is movably clamped in the clamping groove 213 and is abutted against the contacting piece 231, and the electrical connection of the circuit board 14 and the battery 22 can be conducted through the connecting member 15, the contacting piece 231 and the conductive column 23. The battery 22 in the earphone handle 2 can be used to power supply and charge the speaker module, the battery, and the circuit board 14 and other structures in the earbud structure 1, which is not limited here.

Figure 12:
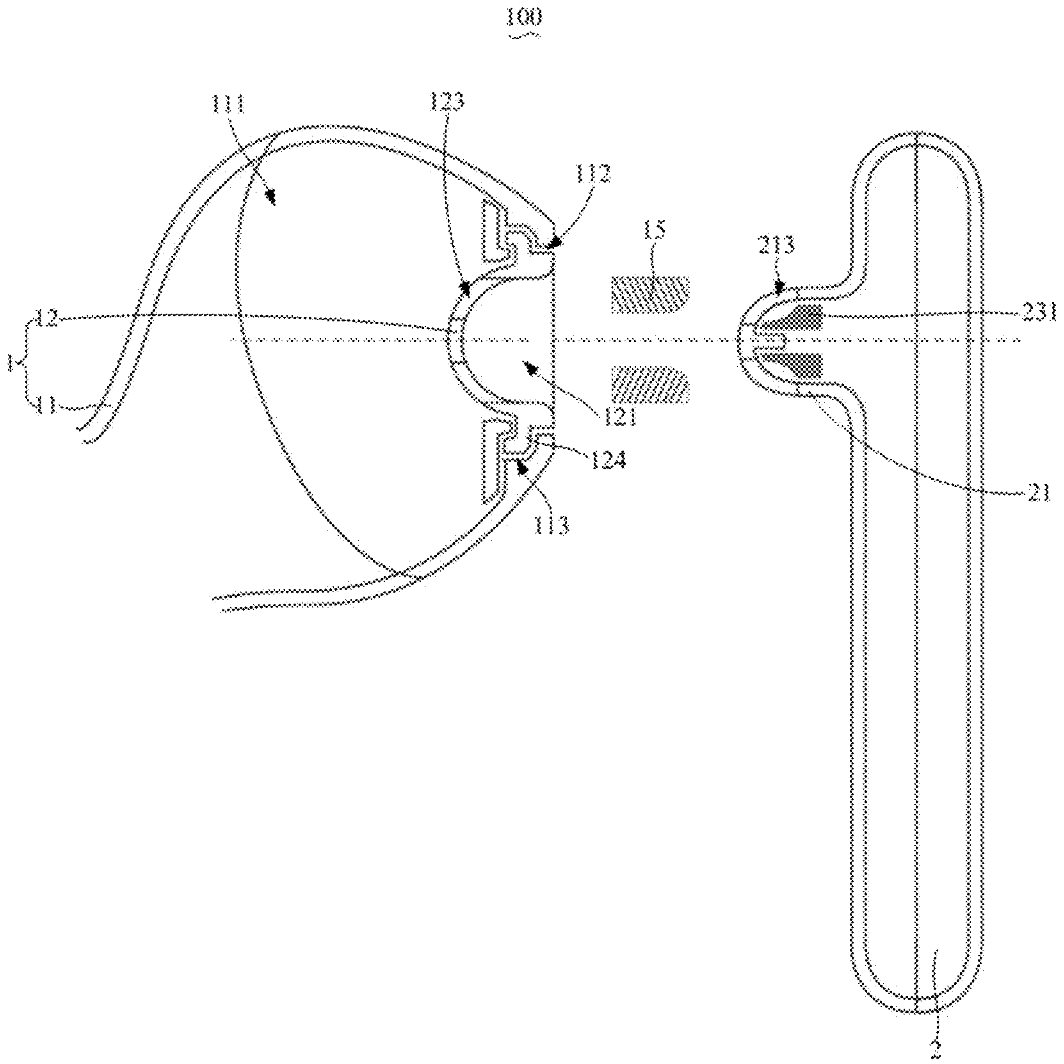
FIG. 12 is an exploded cross-sectional view of the earphone according to an embodiment of the present application.

In this embodiment, as shown in FIG. 12 to FIG. 14, one end of the connecting member 15 located in the rotating groove 121 is provided with a second convex arc surface, and the contacting piece 231 is provided with a second concave arc surface matched with the second convex arc surface.

It can be understood that the end of the connecting member 15 located in the rotating groove 121 is provided with the second convex arc surface, and the contacting piece 231 is provided with the second concave arc surface matched with the second convex arc surface, so that when the connecting member 15 is clamped in the clamping groove 213, the second convex arc surface of the connecting member 15 is abutted against the second concave arc surface of the contacting piece 231. When the axis of the earphone handle 2 swings relative to the earbud structure 1, the second convex arc surfaces of the two connecting member 15 respectively move along the second concave arc surface of the contacting piece 231 in the two clamping grooves 213, so that the angle θ1 between the axis of the earphone handle 2 and the reference plane can rotate within the range of 0 to 45°.

In an embodiment, as shown in FIG. 5 to FIG. 16, the earbud structure 1 includes an earbud shell 11 and a rotating shell 12. The earbud shell 11 is provided with the cavity 111 and an opening 112 communicated with the cavity 111, the rotating shell 12 is provided with the rotating groove 121, the rotating shell 12 is movable inside the cavity 111, the notch of the rotating groove 121 is in a direct communication with the opening 112, and the connecting member 15 is connected to the rotating shell 12.

It can be understood that the rotating shell 12 is provided at the opening 112, that is, the rotating shell 12 is configured to close the opening 112 of the cavity 111. At this time, the rotating groove 121 is spaced from the cavity 111, the notch of the rotating groove 121 is directly communicated with the opening 112, and the connecting member 15 is connected to the rotating shell 12.

In an embodiment, as shown in FIG. 10 to FIG. 16, the rotating shell 12 is provided with the via hole 123 so that the connecting member 15 passes through the via hole 123 and partially extends into the rotating groove 121 to facilitate the movable engagement with the clamping groove 213 of the rotating portion 21.

In an embodiment, as shown in FIG. 4, and FIG. 7 to FIG. 9, the part of the rotating shell 12 and the part of the earbud shell 11 adjacent to the opening 112 are enclosed to form the fixed chamber 114. At this time, the elastic member 131 of the abutting shaft 13 is located in the fixed chamber 114, one end of the connector 132 extends into the fixed chamber 114 and the elastic member 131, and the other end of the connector 132 extends into the rotating groove 121 through the sliding port 115 to facilitate the movable clamp with the shaft hole 212.

In this embodiment, the rotating shell 12 is actively located in the cavity 111, that is, the rotating shell 12 is actively clamped in the earbud shell 11.

In an embodiment, as shown in FIG. 12 to FIG. 16, the earbud shell 11 is provided with the sliding groove 113 adjacent to the opening 112, and the rotating shell 12 is provided with a slider 124 adjacent to the notch of the rotating groove 121. The slider 124 is slidably provided in the sliding groove 113 to facilitate the rotation connection of the rotating shell 12 and the earbud shell 11.

In this embodiment, the earbud shell 11 is provided with the sliding groove 113 adjacent to the opening 112, and the rotating shell 12 is provided with a slider 124 adjacent to the notch of the rotating groove 121. The slider 124 is slidably provided in the sliding groove 113 to facilitate the rotation connection of the rotating shell 12 and the earbud shell 11.

It can be understood that the sliding groove 113 can be provided on the inner wall or the outer wall of the earbud shell 11. In other embodiments, the sliding groove 113 can also be provided in the rotating shell 12, and the slider 124 can be provided in the earbud shell 11, which is not limited here.

In order to realize the smooth rotation of the rotating shell 12 relative to the earbud shell 11, in an embodiment, the earbud shell 11 is provided with two sliding grooves 113, and the two sliding grooves 113 are symmetrical. The rotating shell 12 is provided with two sliders 124, and the sliders 124 are slidably provided in the sliding groove 113. The connection line of the two sliders 124 and the connection line of the two connecting members 15 are set at an angle, and the connection line of the two connecting members 15 is defined as the reference line. When the rotating shell 12 rotates relative to the earbud shell 11, the angle between the axis of the earphone handle 2 and the reference line is θ2, and 0≤θ2≤45°.

It can be understood that the rotating shell 12 rotates along the periphery of the opening 112 of the earbud shell 11. The connection line between the two sliders 124 and the connection line between the two connecting members 15 is at the angle, the rotating shell 12 is limited by the connecting member 15 and the earphone handle 2, so that the rotating shell 12 is pushed to rotate along the periphery of the opening 112 of the earbud shell 11 by the earphone handle 2 through the connecting member 15.

In this embodiment, the plane where the opening 112 of the earbud shell 11 is located is the reference plane. At this time, the rotating shell 12 drives the earphone handle 2 to rotate along the peripheral direction of the opening 112 in the reference plane. It can be understood that the sliding groove 113 is the arc-shaped groove, and the two sliding grooves 113 are symmetrical, so that when the rotating shell 12 rotates relative to the earbud shell 11, the angle between the axis of the earphone handle 2 and the reference line is θ2, and 0≤θ2≤45°. That is, the angle at which the axis of the earphone handle 2 swings at the reference plane of the plane where the opening 112 of the earbud shell 11 is located is between 0 and 45°. In an embodiment, the angle θ2 is 0, 1°, 2°, 3°, 4°, 5°, 6°, 7°, 8°, 9°, 10°, 11°, 12°, 13°, 14°, 15°, 16°, 17°, 18°, 19°, 20°, 25°, 30°, 35°, 40°, 45°, etc., which is not limited here. The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. An earphone, comprising:

an earbud structure; and an earphone handle rotatably connected to the earbud structure to adjust a wearing posture of the earphone handle;

wherein one of the earphone handle and the earbud structure is provided with a rotating portion, and the other of the earphone handle and the earbud structure is provided with a rotating groove, and the rotating portion is rotatably provided in the rotating groove, so that the earphone handle is rotatably connected to the earbud structure, one end of the earphone handle is provided with the rotating portion, and the earbud structure is provided with the rotating groove, a plane where a notch of the rotating groove is located is defined as a reference plane, and an axis of the earphone handle is configured to extend along an extension direction of the earphone handle, and in response to that the earphone handle rotates relative to the earbud structure, an angle between the axis of the earphone handle and the reference plane is θ1, and 0≤θ1≤45°.

2. The earphone of claim 1, wherein the rotating portion is provided with a shaft hole, the earbud structure is provided with an abutting shaft at least partially in the rotating groove, and the abutting shaft is rotatably provided in the shaft hole.

3. The earphone of claim 2, wherein the earbud structure is further provided with a fixed chamber and a sliding port, and the fixed chamber is communicated with the rotating groove through the sliding port; and the abutting shaft comprises an elastic member and a connector, one end of the elastic member is connected to a wall of the fixed chamber, the other end of the elastic member is connected to one end of the connector, and the other end of the connector is configured to extend into the rotating groove through the sliding port and is rotatably provided in the shaft hole.

4. The earphone of claim 2, wherein the rotating portion is further provided with a first convex arc surface, and a wall of the rotating groove is formed with a first concave arc surface matched with the first convex arc surface; and/or the earphone handle is provided with a battery, the rotating portion is provided with a conductive column electrically connected to the battery, and the conductive column is provided with a contacting piece corresponding to the shaft hole; the earbud structure is provided with a circuit board, the abutting shaft is electrically connected to the circuit board, and the abutting shaft is rotatably provided in the shaft hole and is abutted against the contacting piece.

5. The earphone of claim 1, wherein the rotating portion is a spherical convex portion, and the rotating groove is a spherical concave groove matched with the spherical convex portion.

6. The earphone of claim 5, wherein the rotating portion is provided with a clamping groove, the earbud structure is further provided with a connecting member at least partially in the rotating groove, and the connecting member is movably clamped in the clamping groove.

7. The earphone of claim 6, wherein two connecting members are provided, the two connecting members are symmetrical and along the extension direction of the earphone handle, and the rotating portion is provided with the clamping groove corresponding to the connecting member.

8. The earphone of claim 6, wherein the earbud structure is also provided with a cavity and a circuit board located in the cavity, the wall of the rotating groove is provided with a via hole communicated with the cavity, and one end of the connecting member is configured to extend into the cavity through the via hole and is electrically connected to the circuit board;

the earphone handle is provided with the battery, the rotating portion is provided with a conductive column electrically connected to the battery, and the conductive column is provided with the contacting piece corresponding to the clamping groove; and the connecting member is movably clamped in the clamping groove and is abutted against the contacting piece.

9. The earphone of claim 8, wherein one end of the connecting member located in the rotating groove is provided with a second convex arc surface, and the contacting piece is provided with a second concave arc surface matched with the second convex arc surface.

10. The earphone of claim 6, wherein the earbud structure comprises:

an earbud shell, wherein the earbud shell is provided with the cavity and an opening communicated with the cavity; and a rotating shell, wherein the rotating shell is provided with the rotating groove, the rotating shell is movably provided in the cavity, the notch of the rotating groove is directly communicated with the opening, and the connecting member is connected to the rotating shell.

11. The earphone of claim 10, wherein the earbud shell is provided with a sliding groove adjacent to the opening, the rotating shell is provided with a slider adjacent to the notch of the rotating groove, and the slider is slidably provided in the sliding groove, so that the rotating shell is rotatably connected to the earbud shell.

12. The earphone of claim 11, wherein the earbud shell is provided with two sliding grooves, the two sliding grooves are symmetrical, the rotating shell is provided with two sliders, and the sliders are slidably provided in the sliding groove;

a connection line between the two sliders and a connection line between the two connecting members are at an angle, and the connection line of the two connecting members is defined as a reference line; and in response to that the rotating shell rotates relative to the earbud shell, an angle between the axis of the earphone handle and the reference line is $\theta 2$, and $0 \leq \theta 2 \leq 45°$.

13. The earphone of claim 1, wherein the earbud structure is provided with a first magnetic member, and the earphone handle is provided with a second magnetic member magnetically connected to the first magnetic member.

* * * * *